US007585055B2

(12) United States Patent
Nystrom et al.

(10) Patent No.: US 7,585,055 B2
(45) Date of Patent: Sep. 8, 2009

(54) INTEGRATED PRINTHEAD WITH POLYMER STRUCTURES

(75) Inventors: Peter J. Nystrom, Webster, NY (US); Peter M. Gulvin, Webster, NY (US)

(73) Assignee: Xerox Corporation, Norwalk, CT (US)

(*) Notice: Subject to any disclaimer, the term of this patent is extended or adjusted under 35 U.S.C. 154(b) by 469 days.

(21) Appl. No.: 11/239,389

(22) Filed: Sep. 30, 2005

(65) Prior Publication Data

US 2007/0076055 A1 Apr. 5, 2007

(51) Int. Cl.
*B41J 2/05* (2006.01)
*B23P 17/00* (2006.01)

(52) U.S. Cl. ........................... 347/62; 347/63; 29/890.1

(58) Field of Classification Search ................... 347/45, 347/47, 54, 57, 62–64; 29/729, 890.1
See application file for complete search history.

(56) References Cited

U.S. PATENT DOCUMENTS 6,592,205 B2 * 7/2003 Beerling et al. ............... 347/42
6,641,254 B1 * 11/2003 Boucher et al. ............... 347/50

OTHER PUBLICATIONS

"Surface Micromachining for Microsensors and Microactuators", Roger T. Howe, pp. 1809-1813, j. Vac. Sci. Technol. B6 (6), Nov./Dec. 1988.
"Microfabricated Hinges", Pister et al., Sensors and Actuators A, 33, pp. 249-256, 1992.
"Micro-Machined Three-Dimensional Micro-Optics for Integrated Free-Space Optical System", Lin et al., IEEE Photonics Technology Letters, vol. 6, No. 12, 1994.

* cited by examiner

*Primary Examiner*—Stephen D Meier
*Assistant Examiner*—Geoffrey Mruk
(74) *Attorney, Agent, or Firm*—Oliff & Berridge, PLC

(57) ABSTRACT

A printhead manufacturing method includes providing a first wafer, forming a polymer layer over the first wafer, the polymer layer including at least one via, providing a metal layer over the at least one via, providing a solderable or plateable interface layer over the metal layer and the polymer layer, forming a fluid chamber in the polymer layer, providing a fluid nozzle in the first wafer, providing a second wafer, and joining the second wafer to the first layer to form the printhead. A printhead that includes a first wafer, a polymer layer over the first wafer, the polymer layer including at least one via, a metal layer over the at least one via, an interface layer over the metal layer and the polymer layer, a fluid chamber formed in the polymer layer, and a fluid chamber formed in the first wafer.

15 Claims, 3 Drawing Sheets

INTEGRATED PRINTHEAD WITH POLYMER STRUCTURES

BACKGROUND

Inherent thin film properties of materials can limit many surface micromachining processes. For example, variability of materials properties in polysilicon thin films can prohibit the manufacture of desired microstructures. This is particularly apparent in micro-optical components, such as mirrors, lenses, diffraction gratings, and micro-electromechanical structures (MEMS).

The leading commercial MEMS processing technologies are bulk micromachining of single crystal silicon, and surface micromachining of polycrystalline silicon. Each of these processing technologies has associated benefits and barriers. Single crystal silicon bulk micromachining is a material with well-controlled electrical and mechanical properties in its pure state. Single crystal silicon bulk micromachining has historically utilized wet anisotropic and wet etching to form mechanical elements. In this process, the etch rate is dependent on the crystallographic planes that are exposed to the etch solution, so that mechanical elements are formed that are aligned to the rate limiting crystallographic planes. The etch rate also varies with dopant concentration, so that the etch rate can be modified by the incorporation of dopant atoms, which substitute for silicon atoms in the crystal lattice.

In contrast to bulk micromachining, surface micromachining of polycrystalline silicon can utilize chemical vapor deposition (CVD) and reactive ion etching (RIE) patterning techniques to form mechanical elements from stacked layers of thin films (see, e.g., R. T. Howe, "Surface micromachining for microsensors and microactuators", J. Vac. Sci. Technol. B6, (1988) 1809). Typically, CVD polysilicon is used to form the mechanical elements, CVD nitride is used to form electrical insulators, and CVD oxide is used as a sacrificial layer. Removal of the oxide by wet or dry etching releases the polysilicon thin film structures. The advantage of the surface micromachining process is the ability to make complex structures in the direction normal to the wafer surface by stacking releasable polysilicon layers (see, for example, K. S. J. Pister, M. W. Judy, S. R. Burgett, and R. S. Fearing, "Microfabricated hinges", Sensors and Actuators A33, (1992) 249; and L. Y. Lin, S. S. Lee, K. S. J. Pister, and M. C. Wu, "Micromachined three-dimensional micro-optics for free-space optical system", IEEE Photon. Technol. Lett. 6, (1994) 1445) and complete geometric design freedom in the plane of the wafer since the device layers are patterned using isotropic RIE etching techniques.

While surface micromachining relaxes many of the limitations inherent in bulk micromachining of single crystal silicon, it nonetheless has its own limitations in thin film properties. For example, the maximum film thickness that can be deposited from CVD techniques is limited to several microns, so that thicker structures must be built up from sequential depositions.

An integrated MEMS printhead generally consists of two wafers, a MEMS transducer array and an electronics driver/control element. The printhead is formed by bonding these two wafers together. Traditional approaches require etching deep cavities into one of the silicon wafers, thus reducing available surface area for functional use. Other approaches can require complex, high stress features to be built up from the surface. These structures are typically metals, such as, for example, nickel that require plating chemistries that are incompatible with CMOS processing. The metal stack not only forms the ink chambers, but also allows for electrical vias between the two wafers.

SUMMARY

It is possible to leverage standard micro-electronic methods to build up ink sidewalls using photoimageable polymers. These polymers are able to be built-up into thick layers and used to form intricate features. Dielectric materials, such as, for example, benzocyclobutene (BCB) or SU-8 are used in multi chip module (MCM) devices to re-route electrical input/output (I/O) for Chip Scale Packages (CSP). This attribute allows metal layers to be patterned on top of these materials and processed on normal processing equipment. The ability to execute interconnectivity in the sidewalls and the ability to plate solders on the top of this metal then enables robust wafer-to-wafer bonding.

Various exemplary embodiments of systems and methods provide a printhead manufacturing method that includes providing a first wafer, forming a polymer layer over the first wafer, the polymer layer including at least one via, providing a metal layer over the at least one via, and providing an interface layer over the metal layer and the polymer layer.

Various exemplary embodiments of systems and methods provide a printhead that includes a first wafer, a polymer layer over the first wafer, the polymer layer including at least one via, a metal layer over the at least one via, and an interface layer over the metal layer and the polymer layer.

Various exemplary embodiments of systems and methods provide means for manufacturing a printhead that include means for providing a first wafer, means for forming a polymer layer over the first wafer, the polymer layer including at least one via, means for providing a metal layer over the at least one via, means for providing an interface layer over the metal layer and the polymer layer, means for providing a second wafer, means for aligning the second wafer with the first layer, and means for joining the first wafer and the second wafer to form the printhead.

Various advantages of these exemplary embodiments include elimination of deep silicon etching, reduced stress in wafer to wafer bonding, high resolution, high density routing and sealing of various media materials, high yield due to reduced media crosstalk and improved seal integrity, and reduced cost due to eliminating long plating steps.

BRIEF DESCRIPTION OF THE DRAWINGS

Various exemplary embodiments of systems and methods will be described in detail with reference to the following figures, wherein.

DETAILED DESCRIPTION OF EMBODIMENTS

These and other features and advantages are described in, or are apparent from, the following detailed description of various exemplary embodiments of systems and methods.

Figure 1:
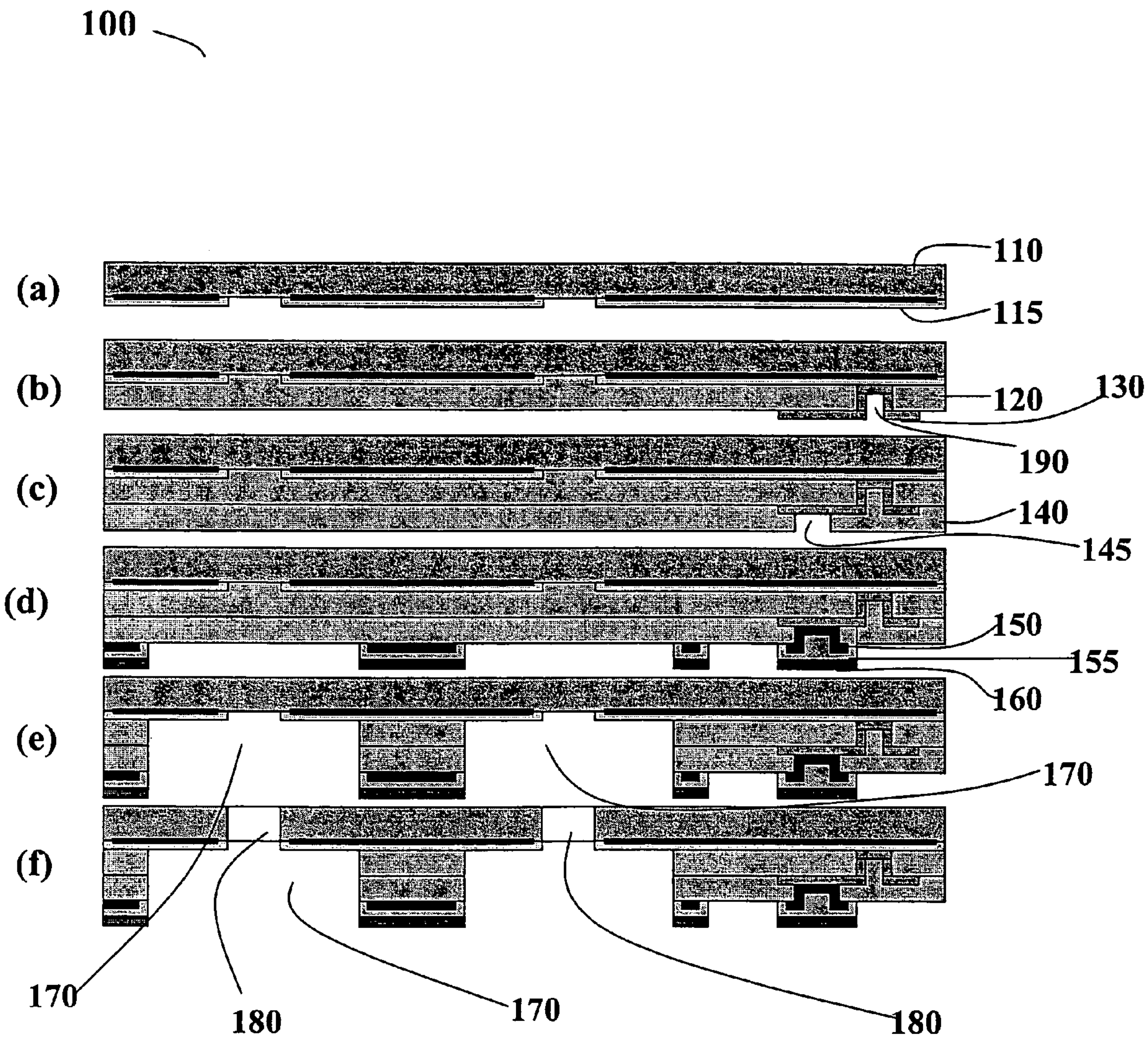
FIGS. 1(*a*)-(*f*) show steps of an exemplary manufacturing process of an exemplary lid wafer polymer structure.

FIGS. 1(*a*)-(*f*) show exemplary steps of the manufacture of an exemplary lid wafer polymer structure 100. As shown in FIG. 1(*a*), the polymer structure 100 can include a base lid wafer 110 that can also have, for example, a CMOS circuitry

115. The CMOS circuitry 115 may be present along the entire length of the lid wafer, or may only be present on portions of the lid. In the exemplary embodiment illustrated in FIG. 1(*a*), several CMOS circuits or regions 115 are present on several portions of the lid wafer.

In FIG. 1(*b*), a first layer of polymer 120 such as, for example, benzocyclobutene (BCB) or SU-8, is provided over the lid wafer 110 that includes the CMOS circuitry 115. According to various exemplary embodiments, a via 190 may be provided in the first layer 120 by patterning. Also, the first layer 120 may be metallized by providing a layer of metal layer 130 in and adjacent to the via 190. According to various exemplary embodiments, the metal layer 130 provides an electrical via through the first layer 120 to the base lid wafer 110 and CMOS circuitry 115, or provides electrical traces on the surface of the first layer 120.

In FIG. 1(*c*), once the first layer 120 that includes the via 190 has been provided, a second layer 140 may then be added over the first layer 120 and the via 190. According to various exemplary embodiments, the second layer 140 may also be patterned to form a second via 145, and a second metal layer 150 may be provided over the second via 145. According to various exemplary embodiments, the second metal layer 150 provides interconnection inside the second layer 140. The metal layers 130 and 150 may include Aluminum, Nickel, Palladium, Tin, Lead, any combination thereof, or any other types of metals and alloys. Furthermore, the vias 190 and 145, provided in the first layer 120 and the second layer 140, respectively, may be offset from each other in order, for example, to minimize the topography of the overall polymer structure 100, or to provide optimal routing within different layers. It should be noted that, although only two layers 120 and 140 are illustrated in the exemplary embodiment of FIG. 1, more than two layers that include metallized vias offset from the vias in other layers can be provided over the lid wafer 110. It should be noted that although the above description shows two polymer layers 120 and 140 provided over the wafer 110, the lid wafer polymer structure 100 may include only one polymer layer 120.

In FIG. 1(*d*), once the first and second layers 120 and 140 have been provided with the vias 190 and 145, a seed layer 155 may be provided over the second metal layer 150 of the second via 145. According to various exemplary embodiments, the seed layer 155 may include aluminum, nickel, palladium, tin, lead, or any other metals or alloys. The seed layer 155 may be provided in order to provide a solder layer 160. According to various exemplary embodiments, the seed layer provides an interface between a solderable metal such as, for example, gold or palladium, to a non-solderable such as, for example, nickel or aluminum. However, if the second metal layer 150 is solderable, then the solder layer 160 is not needed. The solder layer 160 may provide a way to mechanically and electrically connect two metals, and when the solder layer 160 is solid, the solder layer 160 may provide interconnection between two metals. The solder layer 160 may also allow fixation of the lid wafer to another wafer such as, for example, a MEMS wafer, in order to form a printhead. It should be noted that a solder layer such as the solder layer 160 may not be necessary if the underlying metal is solderable.

In FIG. 1(*e*), once the seed layer 155 and the solder layer 160 are provided over the second metal layer 150 of the second layer 140, etching of both the second layer 140 and of the first layer 120 may be performed. According to various exemplary embodiments, fluid chambers 170 may be created by removing a portion of both the second layer 140 and of the first layer 120. Removing the second layer 140 and the first layer 120 may be performed by any suitable removal technique. An exemplary technique may be, for example, etching, or Deep Reactive Ion Etching (DRIE). It should be noted that a technique such as DRIE generally ensures a good multilayer alignment between the first layer 120 and the second layer 140. In FIG. 1(*e*), only the first layer 120 and the second layer 140 are etched, but not the lid wafer 110 that includes the CMOS wafer 115. According to various exemplary embodiments, etching the first layer 120 and the second layer 140 is performed, for example, using DRIE or any other suitable method. DRIE etching after multiplayer patterning allows forming optical alignments and reduces topography effects. Also, according to various exemplary embodiments, the walls of the fluid chambers 170 are made up of the same material that is included in the first layer 120 and in the second layer 140.

As shown in FIG. 1(*f*), once the first layer 120 and the second layer 140 are etched away and the fluid chambers 170 are created as described with reference to FIG. 1(*e*), fluid nozzles 180 may be created by removing portions of the lid wafer 110. According to various exemplary embodiments, the lid wafer 110 is etched in the regions that are not covered by the CMOS wafer 115. Thus, removing portions of the lid wafer 110 creates fluid nozzles 180. The walls of the fluid nozzles 180 are made up of the same material that is included in the lid wafer 110, and a portion of the CMOS wafer 115.

Figure 2:
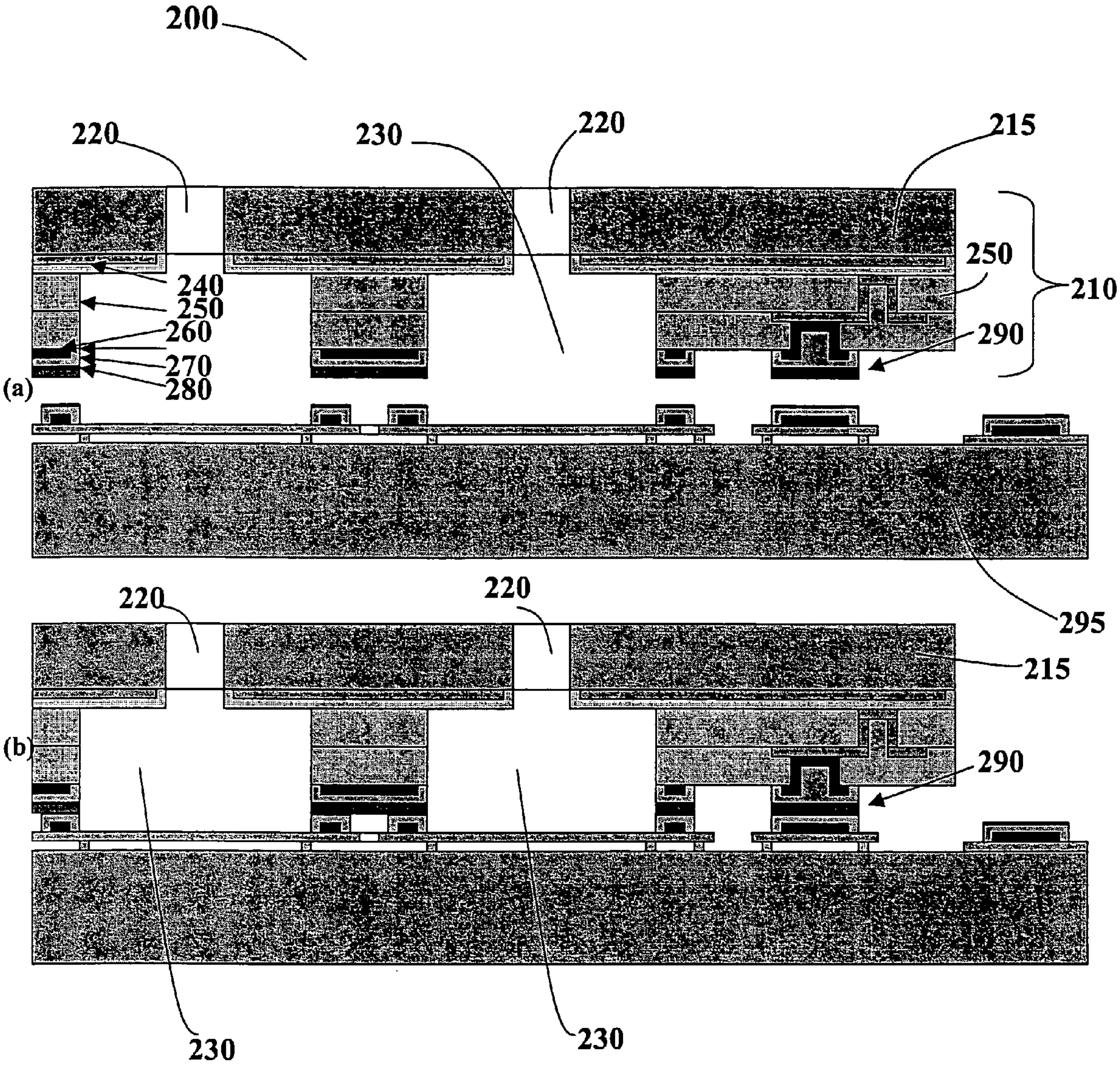
FIGS. 2(*a*)-(*b*) are illustrations of an exemplary lid wafer to MEMS wafer bonding.

FIGS. 2(*a*)-(*b*) are illustrations of an exemplary lid wafer to MEMS wafer bonding in a printhead structure 200. In FIG. 2(*a*), a lid wafer 210, that may correspond to the lid wafer described in FIGS. 1(*a*)-(*f*), and a MEMS wafer 295, are provided. According to various exemplary embodiments, a CMOS layer 240 may be provided over portions of the silicon wafer 215, and the combination of the CMOS layer 240 and the silicon wafer 215 form the lid wafer 210. According to various exemplary embodiments, the lid wafer 210 may be made via standard CMOS processing. Then, as described with reference to FIG. 1(*b*)-(*c*), two polymer layers 250 may be provided over the CMOS layer 240. Again, while shown as two polymer layers, it should be understood that any number of polymer layers of any desired thickness could be provided over the CMOS layer 240. The material making up the polymer layers 250 may be, for example, BCB or SU-8. It should be noted that, although two polymer layers 250 are shown in this exemplary embodiment, other exemplary embodiments of the printhead structure 200 may include more or less than two polymer layers 250. As discussed above, vias may be created in the polymer layers 250, and the vias may be covered by a layer of metal 260. According to various exemplary embodiments, the metal layer 260 may be covered with a seed layer 270, and the seed layer 270 may be covered with a solder layer 280.

Fluid chambers 230 and fluid nozzles 220 may then be created by etching nozzles, apertures or recesses in the lid wafer 210. According to various exemplary embodiments, the recesses for the fluid chambers 230 are created by etching the polymer layers 250 down to the CMOS layers 240, but the CMOS layers 240 are not etched. Moreover, the recesses for the fluid nozzles 220 are created by etching the silicon wafer 215. However, it should be noted that only the portions of the silicon wafer 215 that are not covered by the CMOS layers 240 are etched to create the recesses for the fluid nozzles 220, while the portions of the silicon wafer that are covered by the CMOS layers 240 are not etched.

According to various exemplary embodiments, a second wafer 295 that may be, for example, a MEMS wafer, is formed. The MEMS wafer 295 may be manufactured using silicon surface micro-machining methods. According to various exemplary embodiments, the MEMS wafer 295 can be a surface micromachined electrostatic membrane device. The wafer 295 may include a piezoelectric device, or any other form of deformable actuator. In an electrostatic device, such as the wafer 295, a potential applied to an electrode attracts a movable membrane of an opposite or neutral polarity. When the membrane is attracted to the electrode, the liquid is drawn into the fluid chamber 230, thus preparing it for firing. When the potential is removed, the membrane snaps back, causing an ink droplet to be ejected from the chamber. On the lid wafer 210, once the fluid chambers 230 and the fluid nozzles 220 are created in the lid wafer 210, the lid wafer 210 is then assembled to the second MEMS wafer 295. As shown in FIG. 2(*b*), the lid wafer 210 and the second MEMS wafer 295 may be aligned and joined together or bonded to each other via a bond pad 290, and the combination of the lid wafer 210 and the MEMS wafer 295 results in the completion of the printhead 200 with the complete fluid chambers 230 and fluid nozzles 220. Although the above-described principles are applied to the fabrication of a printhead structure, these principles can be applied to any type of structure that uses a system-on-a-chip approach. For example, biomedical, sensing, and other multi-material processing can use these principles.

Figure 3:
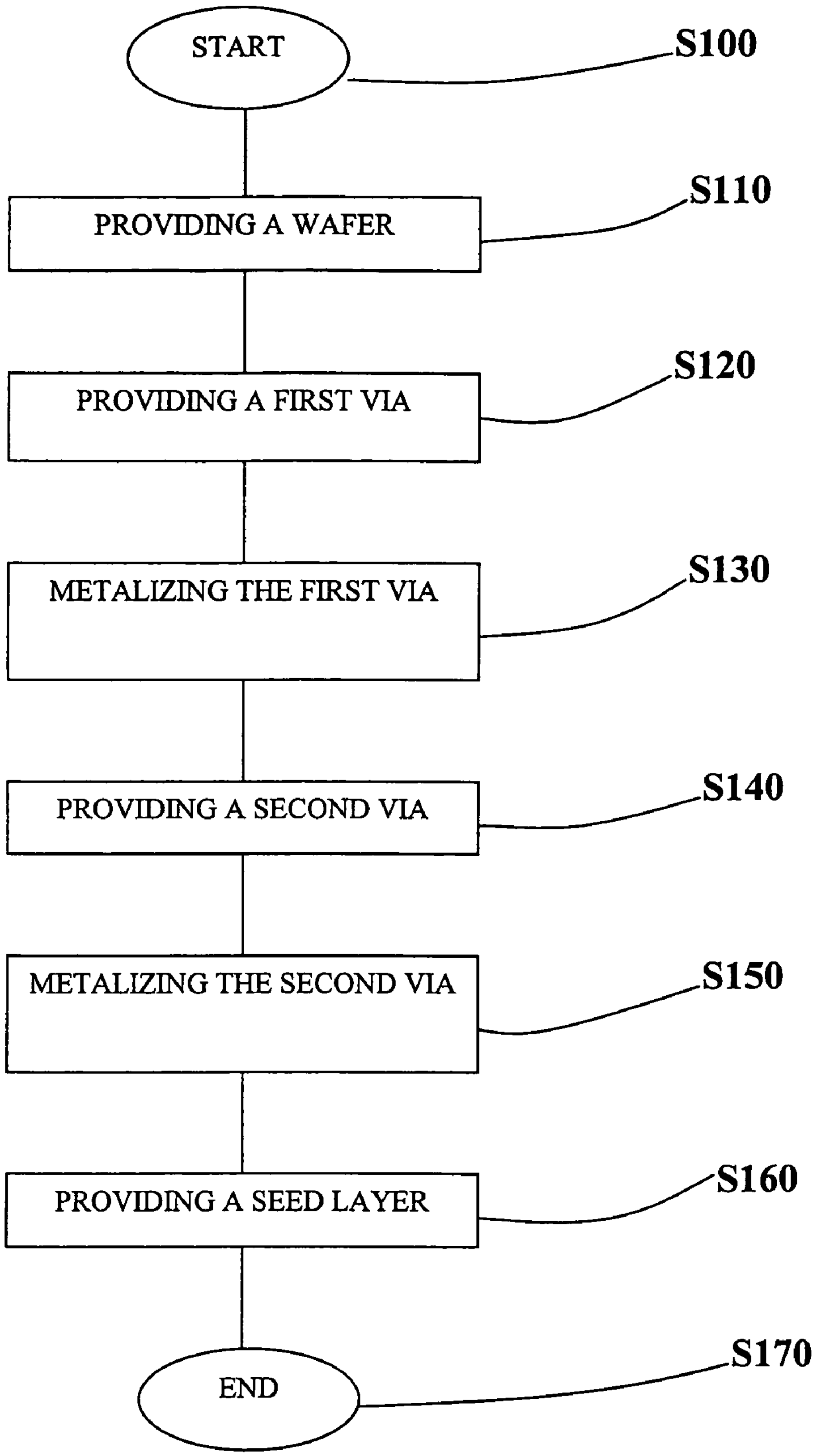
FIG. 3 is a flow chart illustrating an exemplary manufacturing process of a lid polymer wafer.

FIG. 3 is a flow chart illustrating an exemplary manufacturing method of a LID polymer wafer. In FIG. 3, the method starts in step S100, and continues to step S110. During step S110, a wafer is provided. According to various exemplary embodiments, the wafer may be a CMOS wafer including a silicon layer. Next, control continues to step S120, where a first layer is provided over the wafer. According to various exemplary embodiments, the first layer contains a polymer. Next, control continues to step S130, where a via is created in the first layer, then the via metal layer is provided over the via. According to various exemplary embodiments, a via is created in the first layer by, for example, forming a recess in the first layer. Once a metal layer is provided over the via, the metallized via may be used to interconnect the first layer to the remainder of the structure. Next, control continues to step S140.

During step S140, a second layer is provided over the first layer and the via formed on the first layer. According to various exemplary embodiments, the second layer contains a polymer. Next, control continues to step S150, where a second via is formed in the second layer, and a second metal layer is provided over the second via. Once the second metal layer is provided over the second via, the metallized second via may be used to interconnect the first layer to the remainder of the structure. It should be noted that more than one via may be created in either the first layer or the second layer. According to various exemplary embodiments, the vias provided in the first layer and the vias provided in the second layer are offset from each other in a lateral direction in order to provide a minimum topography of the overall structure.

Next, control continues to step S160, where a seed layer is provided over the metallized second via. According to various exemplary embodiments, the seed layer may be soldered to the metallized second via that is provided in the second layer. It should be noted that, although the steps described here describe providing only two layers, more than two layers may be provided over the initial wafer, and each layer may have one or several vias covered by a metal layer, as discussed above for both the first and the second layers. Next, control to continues to step S170, where the method ends.

It should be noted that once the seed layer is provided over the metallized via of the outermost layer of the wafer structure, the polymer layers may be etched in order to created and one or more fluid chambers. In order to created fluid chambers, the polymers are etched, however the CMOS layer that may be present between the polymer layers and the original wafer is not etched. Moreover, fluid nozzles may be created by etching the original wafer. However, only the portions of the original wafer that are not covered by the CMOS layer are etched to create the fluid nozzles. Finally, the structure resulting from the above-described steps can be combined with a MEMS wafer in order to form a printhead.

It will be appreciated that variants of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A printhead manufacturing method, comprising:
providing a first wafer;
forming a polymer layer over the first wafer, the polymer layer including at least one via;
providing a metal layer over the at least one via; and
providing an interface layer over the metal layer and the polymer layer, wherein the interface layer comprises a seed layer and a solder layer over the seed layer, wherein the polymer layer and the metal layer comprise:
a first polymer layer;
a first via in the first polymer layer;
a first metal layer over the first via;
a second polymer layer over the first polymer layer;
a second via in the second polymer layer; and
a second metal layer over the second via.

2. The method of claim 1, further comprising:
forming at least one fluid chamber in the polymer layer; and
providing at least one fluid nozzle in the first wafer.

3. The method of claim 1, wherein the polymer includes at least one of BCB and SU-8.

4. The method of claim 1, wherein at least one of providing the first metal layer over the first via and providing the second metal layer over the second via includes providing a layer of at least one of aluminum, nickel, tin and lead.

5. The method of claim 1, wherein providing the seed layer over the second layer includes at least one of plating the seed layer over the second layer and providing additional metals and solder including at least one of aluminum, nickel, tin and lead.

6. The method of claim 1, wherein providing the seed layer over the second layer includes providing a metal substantially identical to the second metal layer.

7. The method of claim 1, further comprising:
providing a second wafer;
aligning the second wafer with the first wafer; and
joining the first wafer and the second wafer to form the printhead.

8. The method of claim 7, wherein the second wafer includes a MEMS wafer including at least one of a sensor and an actuator.

9. A printhead, comprising:
a first wafer;
a polymer layer over the first wafer, the polymer layer including at least one via;
a metal layer over the at least one via; and
an interface layer over the metal layer and the polymer layer, wherein the interface layer comprises a seed layer and a solder layer over the seed layer, wherein the polymer layer and the metal layer comprise:

a first polymer layer;

a first via in the first polymer layer;

a first metal layer over the first via;

a second polymer layer over the first polymer layer;

a second via in the second polymer layer; and a second metal layer over the second via.

10. The printhead of claim 9, further comprising:

at least one fluid chamber formed in the polymer layer; and at least one fluid nozzle formed in the first wafer.

11. The printhead of claim 9, wherein the polymer layer includes at least one of BCB and SU-8.

12. The printhead of claim 9, wherein at least one of the first metal layer and the second metal layer include at least one of aluminum, nickel, tin and lead.

13. The printhead of claim 9, wherein the first via and the second via are offset from each other.

14. The printhead of claim 9, wherein a second wafer is aligned to the first wafer before the first wafer and the second wafer are joined to form the printhead.

15. The printhead of claim 14, wherein the second wafer includes a MEMS wafer including at least one of a sensor and an actuator.

* * * * *